United States Patent [19]

Gilberts et al.

[11] Patent Number: 4,958,253

[45] Date of Patent: Sep. 18, 1990

[54] LINE PROTECTOR FOR A COMMUNICATIONS CIRCUIT

[75] Inventors: Alexander G. Gilberts, Algonquin; Wayne Rust, Berwyn, both of Ill.

[73] Assignee: Reliance Comm/Tec Corporation, Chicago, Ill.

[21] Appl. No.: 426,791

[22] Filed: Oct. 25, 1989

[51] Int. Cl.[5] .......... H02H 9/06

[52] U.S. Cl. .......... 361/119; 361/127

[58] Field of Search .......... 361/117, 118, 119, 126, 361/127

[56] References Cited

U.S. PATENT DOCUMENTS

| | | | |
|---|---|---|---|
| 3,849,750 | 11/1974 | Baumbach et al. | 337/32 |
| 4,168,515 | 9/1979 | Baumbach | 337/32 |
| 4,796,150 | 1/1989 | Dickey et al. | 361/119 |
| 4,901,188 | 2/1990 | Gilberts | 361/119 |

*Primary Examiner*—Derek S. Jennings

*Attorney, Agent, or Firm*—Michael M. Rickin

[57] ABSTRACT

A line protector for a communications circuit provides at least overvoltage protection. The overvoltage protection is effected through a solid state arrester such as a diode. As the solid state arrester is not as long as the carbon electrode type or gas tube arrester which it replaces, the line protector includes a conductive pedestal. The end of the pedestal adjacent to the solid state arrester is shaped to receive one electrode of the arrester, while the other end of the pedestal is shaped to provide a good contact to the grounding circuit of the protector.

9 Claims, 3 Drawing Sheets

LINE PROTECTOR FOR A COMMUNICATIONS CIRCUIT

BACKGROUND OF THE INVENTION

1. Field of the Invention

This invention relates to improvements in line protectors of the type that are located between equipment to be protected and the outside lines which arrive at the site where the equipment is located.

2. Description of the Prior Art

There are many different protectors which serve to protect equipment from damage as a result of overvoltage and overcurrent conditions on the outside lines entering the site where the equipment is located. One example of such a protector is shown in U.S. Pat. No. 4,168,515 which issued on Sept. 18, 1979 and is assigned to the same assignee as is the present invention (hereinafter "the '515 patent"). The protector shown and described in the '515 patent uses either a gas tube or a carbon element as the means to arrest surges arising from overvoltage conditions on the outside lines.

There has been a trend in the telecommunications industry to use solid state devices as overvoltage arresters in place of either gas tubes or carbon elements. Carbon element and gas tube surge arresting devices rely on an arc discharge to initiate protection. This discharge may cause degradation in the performance of the device which, over time, creates different types of in-service problems. Those problems can range from short circuits to various forms of low voltage operation and current leakage. The degradation can also cause disturbances on the telephone line which are noticeable to the subscriber, who brings them to the attention of the operating company providing the service. The operating company must then have its personnel investigate such "trouble" reports, resulting in the expenditure of both time and money.

Solid state overvoltage arresters, on the other hand, provide noise-free transmission and have a greatly reduced maintenance and longer service life as compared to the carbon element or gas tube surge arresting devices. Therefore, it is desirable to use, wherever possible, solid state overvoltage devices in place of carbon element or gas tube devices. It is further desirable to be able to insert such solid state devices directly in existing line protector units in place of either the carbon element or gas tube surge arresting devices presently used in those units.

SUMMARY OF THE INVENTION

A line protector for a communications circuit. The protector has means providing a connection to ground. The protector also has an assembly consisting of a solid state overvoltage arrester and a conductive pedestal.

The arrester has first and second electrodes. The first electrode is connected to first and second line terminals. The pedestal has a first end which receives the second electrode of the arrester. The pedestal also has a second end which is in contact with the ground connection means of the line protector.

DESCRIPTION OF THE PREFERRED EMBODIMENT

Figure 1:
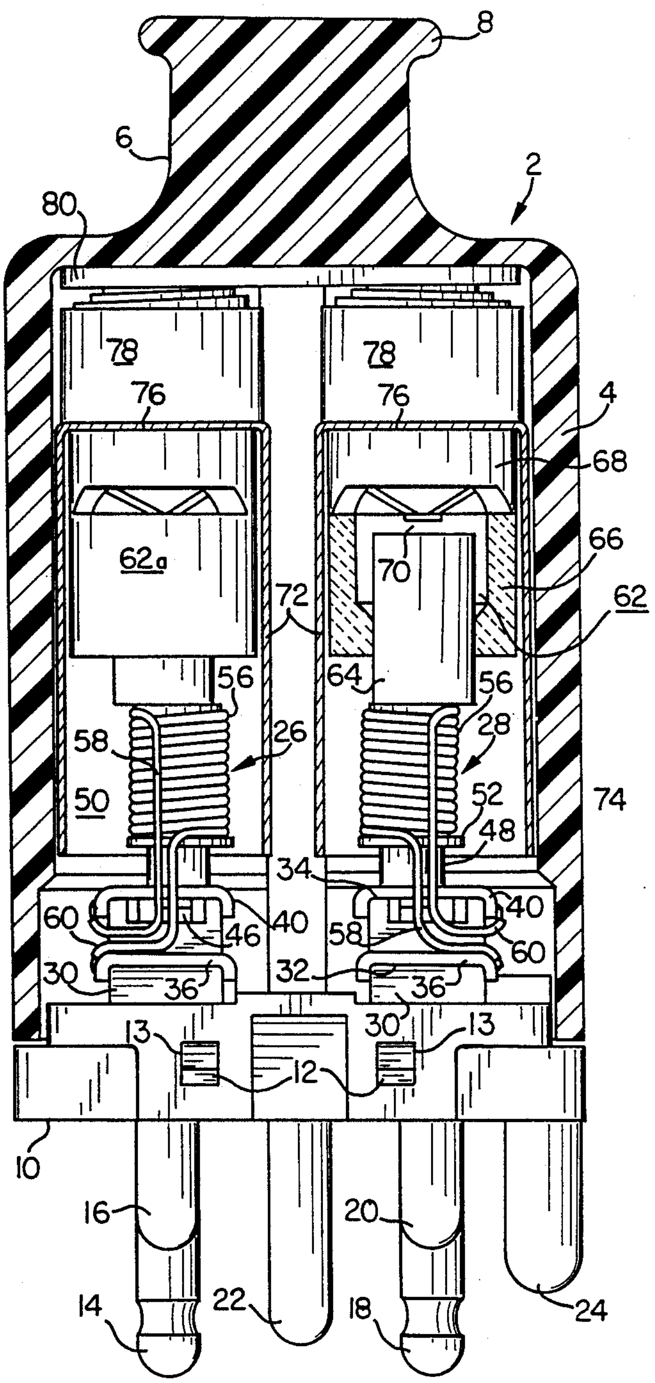
FIG. 1 (PRIOR ART)
FIG. 1 is a front elevational view, partially in section, of a line protector embodied in accordance with the prior art.

Referring now to FIG. 1, there is shown a front elevational view, partially in section, of the line protector 2 described in the '515 patent. As FIG. 1 herein is identical to FIG. 1 of the '515 patent, the same reference numerals are used in this instance as are used in the '515 patent. The construction and operation of the protector described in the '515 patent will now be briefly described, it being understood that a more detailed description may be obtained by referring to that patent.

Protector 2 has a generally rectilinear insulating plastic housing 4, the upper end of which has a neck portion 6 which terminates in a flange 8 by which the protector may be gripped for removal from and placement into a plug-in type terminal board having wired connections to the incoming outside lines and also to the equipment to be protected. At its lower end the housing is closed off by a plastic base 10 containing a plurality of laterally projecting tabs 12. These tabs interlock with a snap fit into openings 13 that are formed on the two wider opposite walls of the housing 4 adjacent to the resilient lower open end of the housing.

Projecting downwardly and through the base 10 is a series of conductive plug-in terminal pins 14, 16, 18, 20 and 22. There is a first line pin 14, a shorter first central office pin 16, a second line pin 18, a shorter second central office pin 20, and a ground pin 22. Protector 2 may also include a plastic polarizing pin 24 if the same is needed to ensure proper orientation of the protector when it is plugged into its receptacle.

The first line pin 14 and the first central office pin 16 are components in one of the two lines (tip or ring) through the protector, while the second line pin 18 and the second central office pin 20 are components in the other line through the protector. The ground pin 22 is suitably connected through the plug-in receptacle to ground in a known manner.

Running from the line pin 14 to the line pin 16 is a heat coil circuit 26, and similarly running between the line pin 18 and the line pin 20 is a like heat coil circuit 28. These heat coil circuits are of similar construction and a detailed description of their construction may be obtained by referring to the '515 patent. Each heat coil circuit is characterized by the fact that there are rigid or permanent connections from one line pin (e.g. 18) to the other line pin (e.g. 20). These connections are preferably effected by staking the line pins to contact plates and by welding the ends of the heat coil winding to the respective contact plates.

The protector also includes a sub-base 30. The specifics of its construction and the manner in which the sub-base interacts with the heat coil circuits 26 and 28 may be obtained by referring to the '515 patent.

Also mounted within the housing 4 and associated with the line circuit running from the pin 14 to the pin 16 is an overvoltage arrester unit 62*a* of known construction. A like arrester unit 62 is associated with the line circuit running from the pin 18 to the pin 20. The particular arrester unit 62 or 62*a* shown in FIG. 1 is of the carbon electrode type and comprises a carbon rod electrode 64, the lower end of which abuts the upper end of the heat coil bobbin 50, thus providing a connection to the line circuit. As is well known in the art, the arrester unit may also be a gas tube.

The upper end of the heat coil bobbin is spaced substantially from the upper end of the bobbin pin 48. The arrester unit 62 also includes a ceramic insulator 66 to which the carbon rod 64 is bonded. Cooperating with the carbon rod electrode is a carbon disc electrode 68 which seats against the upper end face of the insulator 66. The end of the carbon rod that faces the disc 68 is recessed into the insulator so as to define with the disc 68 an arc gap 70. The disc 68 is of known construction.

The overvoltage arrester unit is housed within an inverted metallic cup 72 which also receives the heat coil bobbin 50. The lower open end 74 of the cup 72 is spaced from the plate 40 a distance which is less than the distance from the upper end of the bobbin pin 48 to the lower end of the carbon rod 64.

Interposed between the end wall 76 of the cup 72 and the upper end of the housing 4 is a volute spring 78. This volute spring 78 applies pressure to the cup 72 which in turn presses the carbon rod electrode 64 against the bobbin 50; however, the bobbin stays fixed relative to the pin 48 so long as the fusible solder material 54 remains solid.

The upper end of the volute spring 78 presses against a grounding plate 80 which is positioned against the upper closed end of the housing 4. The grounding plate 80 is of such extent that it contacts both volute springs 78, 78 that are associated with the respective line circuits. The grounding plate is metallic and is staked or otherwise rigidly secured to the ground pin 22 which runs downwardly between the assemblies (heat coil circuit, arrester) in each half of the housing so as to project through the base 10.

In a transient overvoltage condition (also known as a surge) in one of the lines, for example the line in which pins 18 and 20 are located, the voltage will be applied through line pin 18, plate 40, heat coil pin 48 and bobbin 50 to the carbon rod electrode 64. This voltage will cause an arc across the gap 70 to the disc 68 and conduction through the cup 72, volute spring 78, ground plate 80 and ground pin 22 to ground. Under such conditions, the unit is generally self-restoring, requiring no attention of service personnel.

In an overcurrent condition in the line circuit between pins 18 and 20, the heat coil winding 56 will generate sufficient heat to melt the solder 54 whereby the pressure from the volute spring 78, transmitted through to the carbon rod 64, will press against the bobbin 50 causing it to slide downwardly along the pin 48. The action of the spring 78 will also move the metallic cup 72 downwardly until its lower end 74 engages the upper plate 40. The electrical contact between the cup 72 and the plate 40 will immediately ground the line through the ground pin 22.

Reference may be made to Column 5, Lines 21, et seq. of the '515 patent wherein the manner in which the protector 2 is assembled is described.

Figure 2:
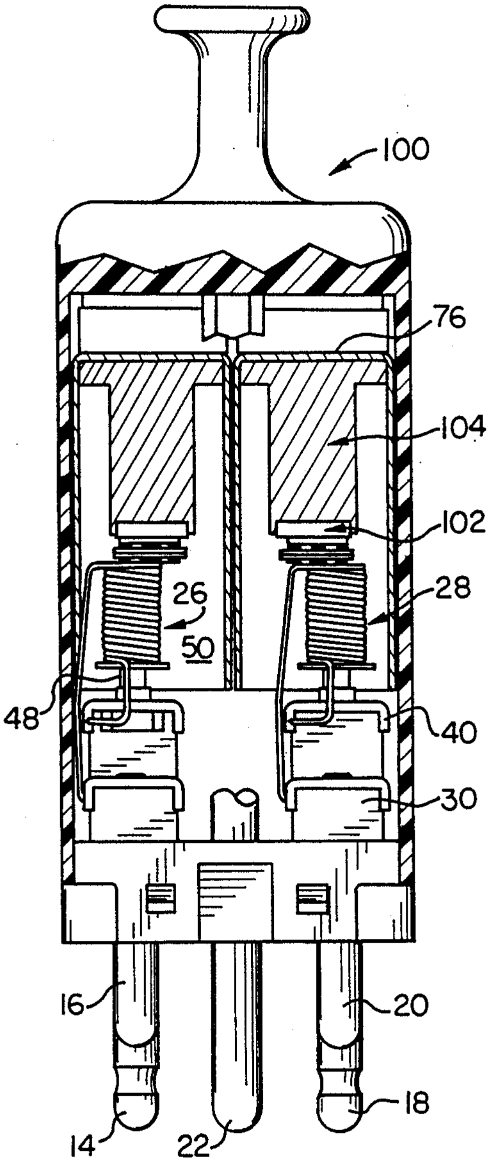
FIG. 2 is a front elevational view, partially in section, of the line protector of the present invention.
Figure 3:
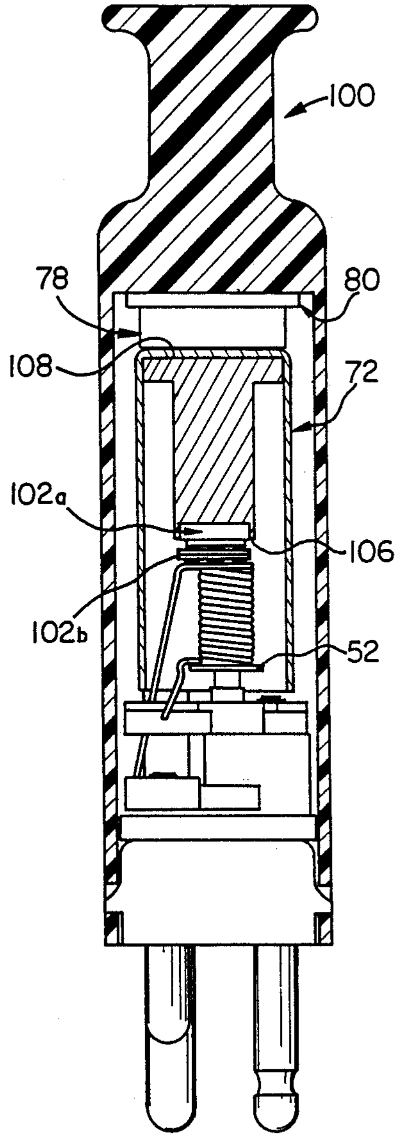
FIG. 3 is a side elevational view, partially in section, of the line protector of FIG. 2.

Referring now to FIGS. 2 and 3, there are shown a front elevational view in section and a side elevational view also in section, respectively of the line protector 100 of the present invention.

As line protector 100 is in many respects identical to line protector 2, those parts in FIGS. 2 and 3 which are identical to parts in FIG. 1 will be given the same reference numerals as are used in FIG. 1 1 and need not be described in detail again. For ease of illustration, only a portion of ground terminal 22 has been shown internal to protector 100.

The principal difference between line protector 100 and line protector 2 is in the type of overvoltage arrester unit that is used in protector 100. As described above for FIG. 1, while the arrester unit shown therein is of the carbon electrode type, it can also be a gas tube. In protector 100, the arrester unit 102 is of the solid state type and more particularly is a diode.

Line protector 100 in a manner identical to line protector 2 uses cup 72 to house diode 102. As diode 102 is substantially shorter than either the carbon electrode type or gas tube overvoltage arrester unit used in line protector 2, line protector 100 also includes in cup 72 a conductive pedestal 104.

Pedestal 104 has a lower end 106 which is in contact with the upper electrode 102*a* of the diode. Pedestal 104 has an upper end 108 which is in contact with the end wall 76 of the cup, i.e. the grounding circuit of the protector. The lower electrode 102*b* of the diode is in contact with the upper end of the heat coil bobbin.

Figure 4:
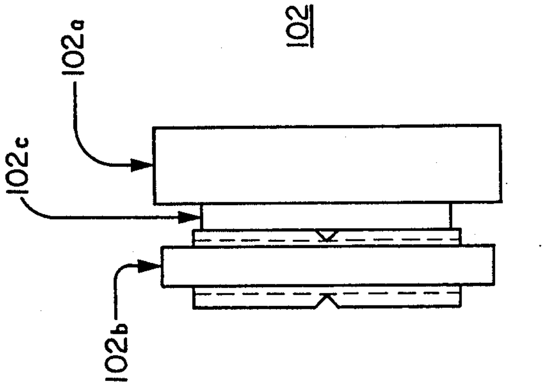
FIG. 4 is a side view of the solid state diode used in the line protector of the present invention.

Referring now to FIG. 4, there is shown a side view of diode 102. Circular electrodes 102*a* and 102*b* are connected to each other by a semiconductor junction 102*c*. The junction may for example, be of the glass-passivated pnpn silicon type and may be connected to the electrodes by soldering. A diode of the type described is available from Teccor Electronics of Irving, Tex.

Figure 5:
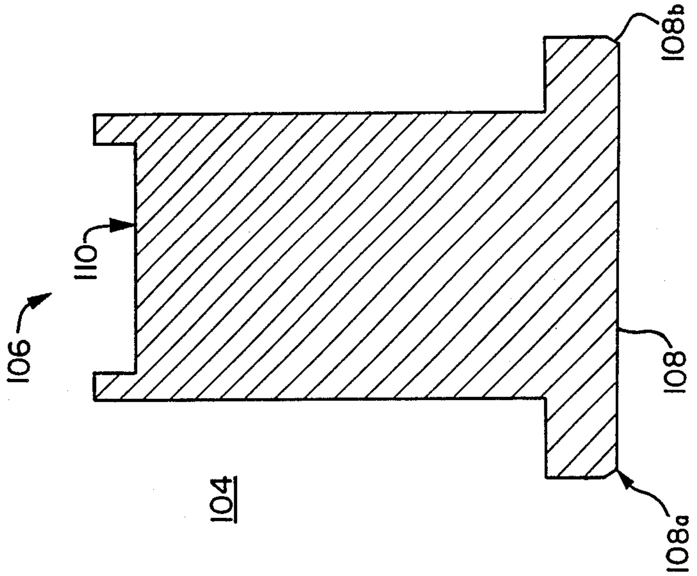
FIG. 5 is a close-up of the pedestal shown in FIGS. 2 and 3.

Referring now to FIG. 5, there is shown a close-up of the pedestal 104 of FIGS. 2 and 3. As in those figures, the pedestal is shown in section. Pedestal 104 is essentially cylindrical in shape with its upper end 108 having a larger diameter than the remainder of the pedestal. Of course, the diameter of the upper end must be no greater than the diameter of cup 72. The upper end includes chamfers 108*a* and 108*b* so that the pedestal makes a relatively snug fit with the end wall of the cup.

The lower end 106 includes a counterbore 110 which appears in FIG. 5 as a U-shaped recess. The counterbore has a diameter which is greater than the diameter of the upper electrode 102*a* of diode 102. As can be seen by referring to FIG. 4, the diameter of electrode 102*a* is slightly larger than the diameter of electrode 102*b*. Countebore 110 has a depth which is slightly less than the depth of either electrode 102*a* and 102*b*.

In one embodiment for line protector 100, the depth of recess 110 was 0.028 inches (0.71 mm) and the depth of each of the electrodes 102*a* and 102*b* was 0.034 inches (0.86 mm).

While the solid state diode 102 and pedestal 104 have been described in connection with the line protector of the '515 patent, it should be appreciated that the diode and pedestal may be used in place of either carbon electrode type or gas tube arrester units in line protectors which do not include heat coil circuits or in those line protectors which include a heat coil bobbin without a winding or conductive spacer in lieu thereof. Examples of the former kind of line protectors are the 3A and 6A type protectors manufactured and sold by assignee's Reliable Electric operating unit. One or more examples of line protectors of the latter type may be found in U.S. Pat. No. 3,849,750 which is also assigned to the same assignee as is the present invention. The diode 102 and pedestal 104 may also be used in place of either carbon electrode type or gas tube arrester units in those line protectors which do not use a cup 72. In such line protectors, the shape of pedestal 104 and in particular, end 108 may be different from that shown in FIG. 5 in order that a good conductive connection be obtained between the pedestal and that part of the protector which end 108 physically abuts.

Finally, the diode 102 and the pedestal 104 may also be used in place gas tube arrester units now used in station protectors.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. A line protector for a communications circuit comprising:

(a) means for connection to ground;

(b) a solid state overvoltage arrester having first and second electrodes, said first electrode connected to first and second line terminals; and (c) a conductive pedestal having a first end, said first end receiving said second electrode, and a second end in contact with said ground connection means.

2. The line protector of claim 1 wherein said conductive pedestal first end has a counterbore for receiving said second electrode.

3. The line protector of claim 2 wherein said conductive pedestal and said second electrode are both essentially c in shape and the diameter of said counterbore is slightly greater than the diameter of said second electrode.

4. The line protector of claim 1 wherein said means for connection to ground includes a conductive cup having an open end and an end wall, said cup containing said solid state overvoltage arrester and said conductive pedestal such that said pedestal second end is in contact with said end wall.

5. The line protector of claim when conductive pedestal first end has counterbore for receiving said second electrode.

6. The line protector of claim 5 wherein said cup has a predetermined shape and said pedestal second end is of essentially complementary shape to provide a snug fit with said cup.

7. An overvoltage arrester assembly comprising:

(a) a solid state device having first and second electrodes; and (b) a conductive pedestal having a first end for receiving said second electrode and a second end for connection to means for providing a connection to ground.

8. The assembly of claim 7 wherein said pedestal first end has a counterbore for receiving said second electrode.

9. The assembly of claim 8 wherein both said pedestal and said second electrode ar else cylindrical in shape and the diameter of said counterbore is slightly greater than the diameter of said second electrode.

* * * * *

UNITED STATES PATENT AND TRADEMARK OFFICE

CERTIFICATE OF CORRECTION

PATENT NO. : 4,958,253

DATED : September 18, 1990

INVENTOR(S) : A. Gilberts; W. Rust

It is certified that error appears in the above—identified patent and that said Letters Patent is hereby corrected as shown below:

Claim 3, line 3 - "c" should be "cylindrical".

Claim 5, line 1 - after "claim" insert --4--.

Claim 5, line 1 - delete "when" and insert in its place --wherein said--.

Claim 5, line 2 - after "has" insert --a--.

Claim 9, line 2 - "ar" should be "are".

Claim 9, line 2 - "else" should be "essentially".

Signed and Sealed this

Twenty-fourth Day of December, 1991

*Attest:*

HARRY F. MANBECK, JR.

*Attesting Officer* *Commissioner of Patents and Trademarks*